2,727,931
ISOMERIC CYCLOALKYLATION OF AROMATIC COMPOUNDS

Louis Schmerling, Riverside, Ill., assignor to Universal Oil Products Company, Des Plaines, Ill., a corporation of Delaware No Drawing. Application February 9, 1954, Serial No. 409,275

9 Claims. (Cl. 260—668)

This invention relates to a process for isomerization accompanying the cycloalkylation of aromatic compounds, and more particularly to a process for the isomeric cycloalkylation of aromatic hydrocarbons such as benzene.

An object of this invention is to cycloalkylate an alkylatable aromatic compound.

A further object of this invention is to provide a process for the isomeric cycloalkylation of an alkylatable aromatic hydrocarbon such as benzene.

One embodiment of this invention resides in a process for the isomeric cycloalkylation of an aromatic compound by treating an alkylatable aromatic compound with a halo compound consisting of a cycloalkylalkyl halide or a tertiary alkylcycloalkyl halide in the presence of a metallic halide catalyst.

A further embodiment of this invention resides in a process for the isomeric cycloalkylation of an aromatic hydrocarbon such as benzene by treating said benzene with a halo compound such as a cycloalkylalkyl halide or a tertiary alkylcycloalkyl halide in the presence of a catalyst which consists of either aluminum chloride, aluminum bromide, or zirconium chloride, and recovering the resultant condensation product.

A specific embodiment of this invention is found in the isomeric cycloalkylation of an aromatic hydrocarbon such as benzene by treating said benzene with a cycloalkylalkyl halide such as chloromethylcyclohexane in the presence of a catalyst consisting of aluminum chloride at a temperature in the range of from about 0° C. to about +10° C., and recovering the resultant 3- and 4-phenyl-1-methylcyclohexane.

Another specific embodiment of this invention resides in treating benzene with 1-chloro-1-methylcyclohexane in the presence of aluminum chloride at a temperature in the range of from about −5° C. to about +5° C., and recovering the resultant 3- and 4-phenyl-1-methylcyclohexane.

Other objects and embodiments of this invention referring to alternative aromatic compounds and to alternative cycloalkylalkyl halides or tertiary alkylcycloalkyl halides will be found in the following further detailed description of this invention.

Heretofore, it has been known that the alkylation of an aromatic hydrocarbon such as benzene with an alkylating agent containing an alkylcycloalkyl or a cycloalkylalkyl group in the presence of acid catalysts such as sulfuric acid, hydrogen fluoride, etc. will yield a condensation product containing a quaternary carbon atom, i. e., a tertiary cycloalkylbenzene. For example, the condensation of benzene with 1-methylcyclohexene in the presence of sulfuric acid will yield 1-methyl-1-phenylcyclohexane.

It has now been discovered that when an aromatic hydrocarbon such as benzene is alkylated with a cycloalkylalkyl halide (i. e., a haloalkylcycloalkane) or a tertiary alkylcycloalkyl halide in the presence of a Friedel-Crafts type catalyst such as aluminum chloride, an unexpected reaction takes place and the condensation product is not the expected tertiary cycloalkylbenzene, but rather an unexpected isomer, namely, a secondary cycloalkylbenzene. The phenyl group does not enter the side chain of the cycloalkylalkyl halide or the ring of tertiary alkylcycloalkyl halide at the carbon atom holding the halogen, but instead enters the ring of the cycloalkylating compound at a non-tertiary position. This unexpected isomerization of the alkylating product takes place in the presence of the more active Friedel-Crafts type catalysts such as aluminum bromide, zirconium chloride and the above mentioned aluminum chloride. When Friedel-Crafts type catalysts such as ferric chloride, zinc chloride, etc. which are not as active as the aforementioned aluminum and zirconium halides are used, no isomerization occurs with the tertiary alkylcycloalkyl halide and the product of the reaction is a tertiary cycloalkylbenzene. When benzene is alkylated with a haloalkylcycloalkane in the presence of ferric chloride, isomerization may occur but the product is again the tertiary cycloalkylbenzene.

These non-tertiary cycloalkyl aromatic hydrocarbons may be used as intermediates in the production of detergents, insecticides, plastics, high molecular weight resins, or other organic compounds.

Aromatic hydrocarbons which may be alkylated according to the process of the present invention include mononuclear aromatic hydrocarbons such as benzene, monoalkylbenzenes such toluene, ethylbenzene, etc., other alkylated benzenes such as xylene, diethylbenzene, etc. Polynuclear aromatic hydrocarbons such as naphthalene, alkylated naphthalene, anthracene, phenanthrene, chrysene, pyrene, and alkylated derivatives thereof may also be used within the scope of this invention.

Cycloalkylalkyl halides which may be used as the alkylating agents in the present invention include chloromethylcyclopentane, chloromethylcyclohexane, chloromethylcycloheptane, chloromethylcyclooctane, etc., 1-chloroethylcyclopentane, 1-chloroethylcyclohexane, 2-chloroethylcyclopentane, 2-chloroethylcyclohexane, 2-chloroethylcycloheptane, etc., 1-chloropropylcyclopentane, 2-chloropropylcyclohexane, 3-chloropropylcyclohexane, etc., 4-chlorobutylcyclopentane, 4-chlorobutylcyclohexane, etc., 1-bromomethylcyclopentane, 1-bromomethylcyclohexane, 1-bromomethylhexylheptane, etc., 1-bromoethylcyclopentane, 2-bromoethylcyclohexane, 2-bromoethylcycloheptane, 3-bromopropylcyclopentane, 3-bromopropylcyclohexane, etc. Tertiary alkylcycloalkyl halides which may be used as alkylating agents in this invention include 1-chloro-1-methylcyclopentane, 1-chloro-1-methylcyclohexane, 1-chloro-1-methylcycloheptane, etc., 1-chloro-1-ethylcyclopentane, 1-chloro-1-ethylcyclohexane, 1-chloro-1-propylcyclopentane, 1-chloro-1-isobutylcyclohexane, 1-chloro-1-butylcycloheptane, 1-chloro-1-ethylcycloheptane, 1-chloro-1-propylcycloheptane, etc., 1-bromo-1-methylcyclopentane, 1-bromo-1-ethylcyclopentane, 1-bromo-1-propylcyclopentane, 1-bromo-1-methylcyclohexane, 1-bromo-1-ethylcyclohexane, 1-bromo-1-propylcyclohexane, etc., 1-bromo-1-methylcycloheptane, 1-bromo-1-ethylcycloheptane, etc.

In addition to the cycloalkylalkyl halides and tertiary alkylcycloalkyl halides which may be used as alkylating agents it is contemplated within the scope of this invention that alkylcycloalkenes such as 1-methylcyclopentene-1, 1-methylcyclohexene-1, 1-ethylcyclopentene-1, 1-ethylcyclohexene-1, etc. plus hydrochloric acid may also be used in the process of this invention, the alkylcycloalkenes and hydrochloric acid forming the desired alkylating agent halides in situ.

The cycloalkylation of aromatic hydrocarbons with the above mentioned alkylating agents is carried out at a temperature in the range of from about −10° to about +100° C. or more and at a pressure of from substantially atmospheric to about 100 atmospheres. The exact temperature employed in a given cycloalkylation process depends upon the properties of the aromatic hydrocarbon and the halohydrocarbon undergoing alkylation as well as the catalyst employed in the reaction. For example, when aluminum chloride or aluminum bromide is used as a catalyst, it is preferred to operate the reaction at temperatures below about 40° C. It is also preferable to have a substantial excess of aromatic hydrocarbons present in order to retard any side reactions which may occur.

The process of the present invention may be carried out in any suitable manner and may be either a batch or continuous type of operation. In a batch type operation, the halohydrocarbon alkylating agent, as such or in solution in the aromatic hydrocarbon, is gradually added to a stirred (or otherwise mixed) mixture of the aromatic hydrocarbon and the catalyst at the desired temperature. After the addition is complete, stirring is continued for a predetermined period of time. At the end of this time the hydrocarbon layer is separated from the catalyst layer and the cycloalkylbenzene is separated therefrom by conventional means, for example, fractional distillation.

Another method of operation of the present process comprises the continuous type of operation. The cycloalkylation of the aromatic hydrocarbon may be effected by passing a stream containing a suspension of the catalyst in the aromatic hydrocarbon into the reaction zone and mixing it with a stream containing the cycloalkylating agent, as such or in solution in the aromatic hydrocarbon. The reactor which is maintained under suitable operating conditions of temperature and pressure may comprise an unpacked vessel or coil, or it may contain an adsorbent packing material such as fire brick, alumina, dehydrated bauxite and the like. The condensation products are separated from the reactor effluent and unconverted reactants may be recycled to the reaction zone to form a portion of the starting material.

The following examples are given to illustrate the process of this invention which, however, are not intended to limit the generally broad scope of the present invention in strict accordance therewith.

*Example I*

A solution of 95 g. of 2-bromoethylcyclohexane in 40 g. of benzene was slowly added with stirring to a mixture of 8 g. of aluminum chloride in 160 g. of benzene in a glass alkylating flask. The temperature was reduced to approximately 2° C. for a period of 2.5 hours. At the end of this time the upper layer was separated from the lower catalyst layer and subjected to fractional distillation under reduced pressure. Alkylate boiling at 115° to 118° C. at about 5 mm. pressure was obtained in 30% yield. Infra-red analysis indicated that alkylate was not 1-phenyl-2-cyclohexylethane or 1-ethyl-1-phenylcyclohexane but consisted of a mixture of 3-phenyl-1-ethylcyclohexane and 4-phenyl-1-ethylcyclohexane.

*Analysis.*—Found: C,89.55; H,10.69. Calculated for: $C_{14}H_{20}$: C,89.29; H,10.71.

*Example II*

In an experiment similar to that described in Example I, 47 g. of 2-bromoethylcyclohexane in 21 g. of benzene was added to a mixture of 4 g. of aluminum chloride in 80 g. of benzene with continuous stirring. The temperature was maintained at 25° C. for a period of 6 hours, after which the product was allowed to stand overnight at the same temperature. The upper layer was separated from the lower layer, washed and subjected to fractional distillation at reduced pressure. Cycloalkylated product boiling at 152°–153° C. at 26 mm. pressure was separated and subjected to infra-red analysis, said analysis indicating that the product consisted of the same products, that is 3-phenyl-1-ethylcyclohexane and 4-phenyl-1-ethylcyclohexane, as hereinbefore described in Example I.

*Example III*

A solution of 20 g. of 1-chloro-1-methylcyclohexane in 23 g. of benzene was slowly added to a mixture of 2 g. of aluminum chloride in 32 g. of benzene, said mixture being continuously stirred. The alkylation flask and the contents thereof were maintained at a temperature of approximately 0° C. for 3 hours, at the end of which time the flask and the contents thereof were allowed to warm to room temperature. The upper layer was separated from the lower catalyst layer, washed and subjected to fractional distillation at reduced pressure. The cycloalkylation product boiled at 151° C. at 47 mm. pressure. Its infra-red analysis indicated that it was not composed of 1-methyl-1-phenylcyclohexane, but was instead a mixture of 3- and 4-phenyl-1-methylcyclohexane.

I claim as my invention:

1. A process for the isomeric cycloalkylation of an aromatic hydrocarbon which comprises reacting an alkylatable aromatic hydrocarbon with a halo compound selected from the group consisting of cycloalkylalkyl halides and tertiary alkylcycloalkyl halides in the presence of a catalyst selected from the group consisting of aluminum chloride, aluminum bromide, and zirconium chloride, thereby forming a secondary alkylcycloalkyl aromatic hydrocarbon, and recovering the last-named hydrocarbon.

2. A process for the isomeric cycloalkylation of an aromatic hydrocarbon which comprises reacting an alkylatable aromatic hydrocarbon with a halo compound selected from the group consisting of cycloalkylalkyl halides and tertiary alkylcycloalkyl halides in the presence of a catalyst selected from the group consisting of aluminum chloride, aluminum bromide and zirconium chloride at a temperature in the range of from about −10° C. to about 100° C. thereby forming a secondary alkylcycloalkyl aromatic hydrocarbon, and recovering the last-named hydrocarbon.

3. A process for the isomeric cycloalkylation of an aromatic hydrocarbon which comprises reacting benzene with a halo compound selected from the group consisting of cycloalkylalkyl halides and tertiary alkylcycloalkyl halides in the presence of a catalyst selected from the group consisting of aluminum chloride, aluminum bromide and zirconium chloride at a temperature in the range of from about −10° C. to about 100° C., thereby forming a secondary alkylcycloalkyl aromatic hydrocarbon, and recovering the last-named hydrocarbon.

4. A process for the isomeric cycloalkylation of an aromatic hydrocarbon which comprises reacting toluene with a halo compound selected from the group consisting of cycloalkylalkyl halides and tertiary alkylcycloalkyl halides in the presence of a catalyst selected from the group consisting of aluminum chloride, aluminum bromide, and zirconium chloride at a temperature in the range of from about −10° C. to about 100° C., thereby forming a secondary alkylcycloalkyl aromatic hydrocarbon, and recovering the last-named hydrocarbon.

5. A process for the isomeric cycloalkylation of benzene which comprises reacting benzene with chloromethylcyclohexane in the presence of a catalyst selected from the group consisting of aluminum chloride, aluminum bromide, and zirconium chloride at a temperature in the range of from about −10° C. to about 100° C., thereby forming a secondary alkylcycloalkyl aromatic hydrocarbon, and recovering the last-named hydrocarbon.

6. A process for the isomeric cycloalkylation of benzene which comprises reacting benzene with 2-bromoethylcyclohexane in the presence of aluminum chloride at a temperature in the range of from about 0° C. to about +10° C. and recovering the resultant 3- and 4-phenyl-1-ethylcyclohexane.

7. A process for the isomeric cycloalkylation of benzene which comprises reacting benzene with 1-chloro-1-methylcyclohexane in the presence of aluminum chloride at a temperature in the range of from about −5° C. to about +5° C., and recovering the resultant 3- and 4-phenyl-1-methylcyclohexane.

8. A process for the isomeric cycloalkylation of benzene which comprises reacting benzene with 1-chloro-1-ethylcyclohexane in the presence of aluminum chloride at a temperature in the range of from about −5° to about +5° C., and recovering the resultant 3- and 4-phenyl-1-ethylcyclohexane.

9. A process for the isomeric cycloalkylation of benzene which comprises reacting benzene with 1-bromo-1-methylcycloheptane in the presence of aluminum bromide at a temperature in the range of from about −5° C. to about +10° C., and recovering the resultant secondary cycloalkylbenzene.

References Cited in the file of this patent

UNITED STATES PATENTS

| | | |
|---|---|---|
| 1,862,075 | Britton et al. | June 7, 1932 |
| 1,969,984 | Martin et al. | Aug. 14, 1934 |
| 2,104,424 | Ipatieff et al. | Jan. 4, 1938 |
| 2,162,172 | Hönel et al. | June 13, 1939 |
| 2,673,224 | Kennedy et al. | Mar. 23, 1954 |

OTHER REFERENCES

Ipatieff et al.: Jour. Am. Chem. Soc., vol. 72, No. 9, pages 4260–62, September 1950.